April 11, 1950            R. P. ARTHUR            2,503,538
DIAL TRANSMITTER WITH REMOVABLE NUMBER PLATE
AND MEANS FOR ADJUSTING THE MAIN SPRING
Filed April 1, 1947            3 Sheets-Sheet 1
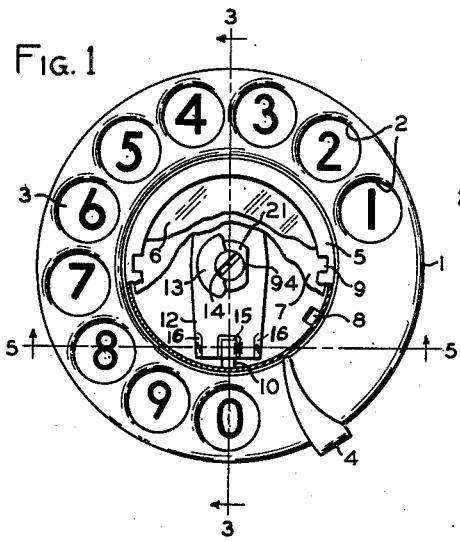
Fig. 1
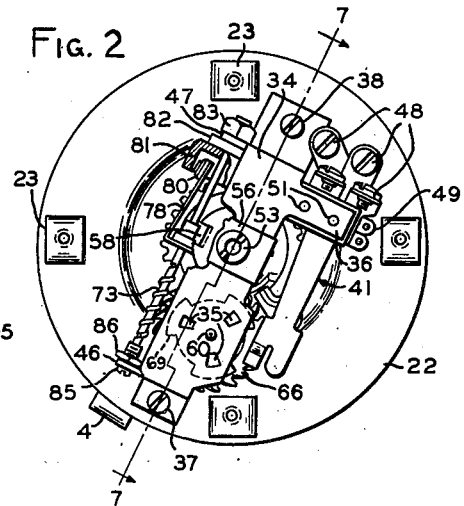
Fig. 2
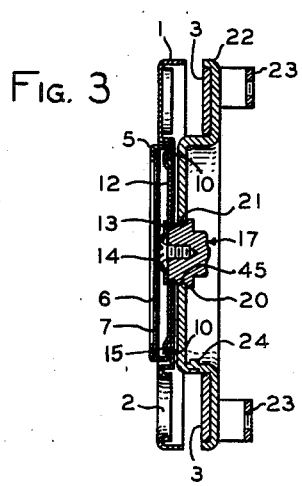
Fig. 3
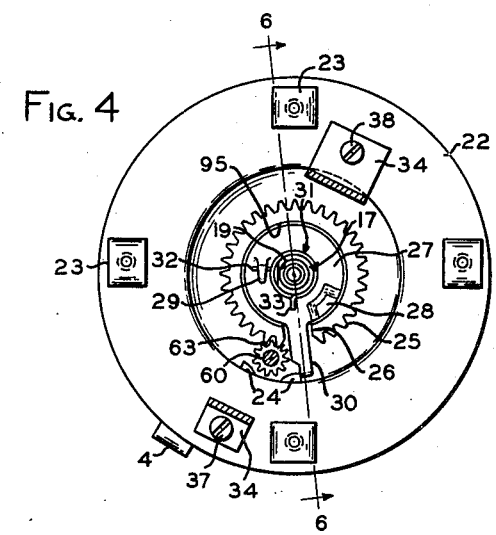
Fig. 4
Fig. 5
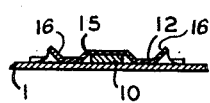
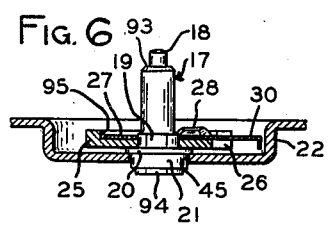
Fig. 6
INVENTOR:
RICHARD P. ARTHUR
BY
ATTORNEY April 11, 1950          R. P. ARTHUR          2,503,538
DIAL TRANSMITTER WITH REMOVABLE NUMBER PLATE
AND MEANS FOR ADJUSTING THE MAIN SPRING
Filed April 1, 1947          3 Sheets-Sheet 2
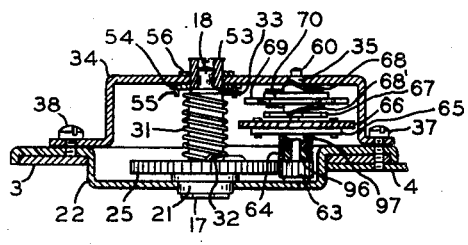
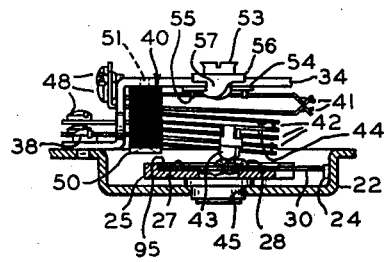
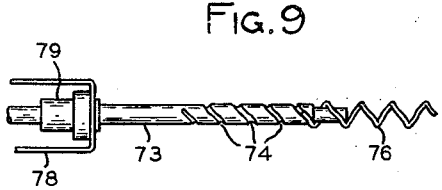
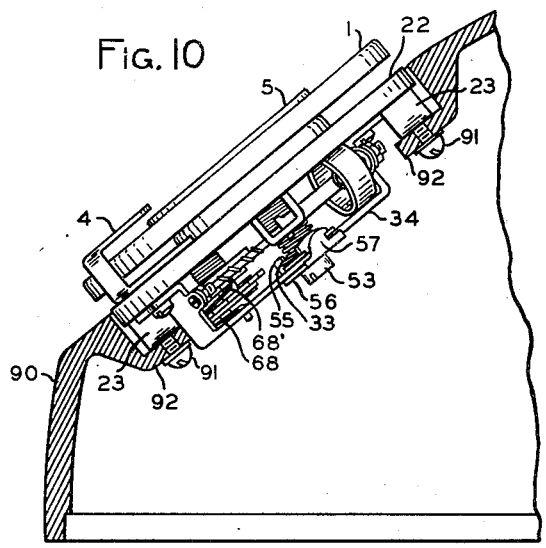
INVENTOR:
RICHARD P. ARTHUR
BY
ATTORNEY

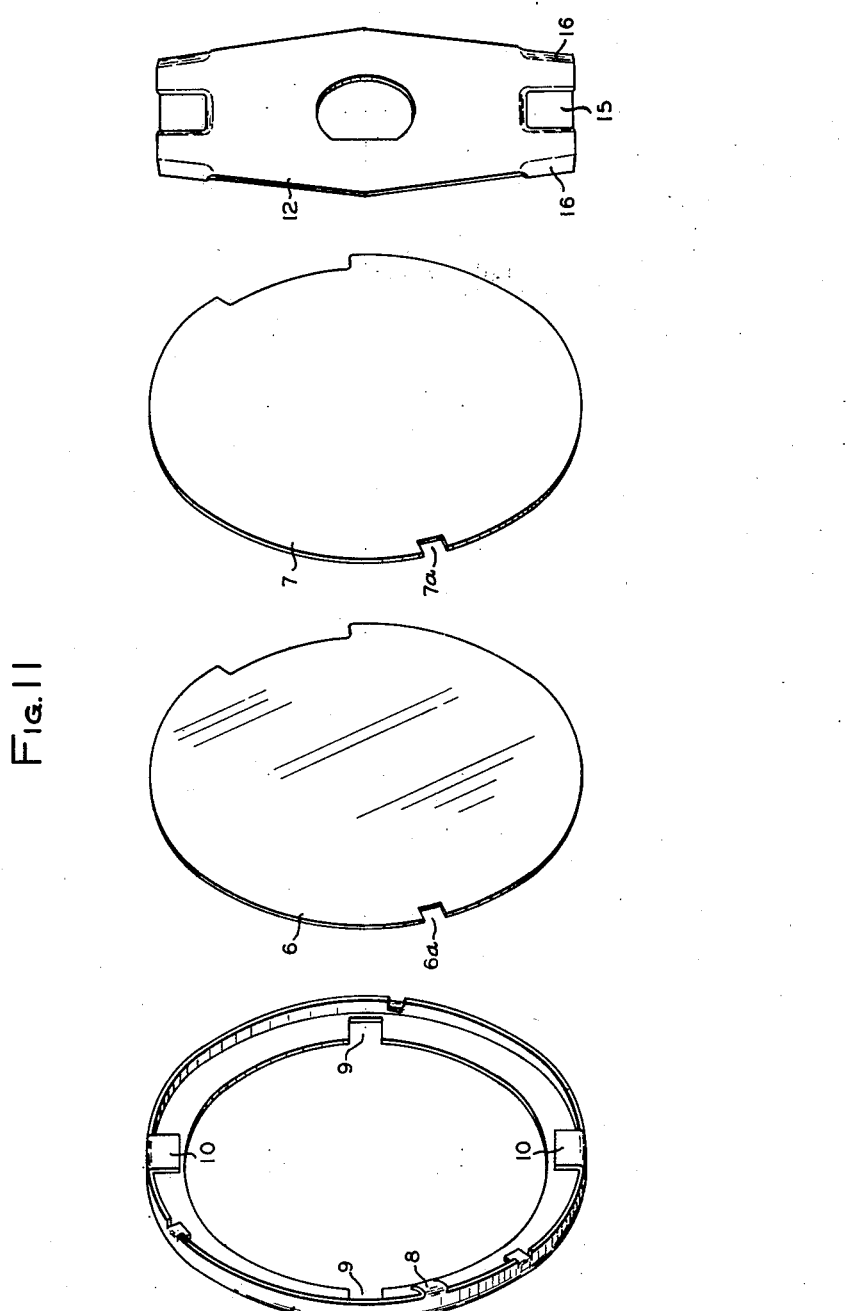

Patented Apr. 11, 1950  2,503,538

UNITED STATES PATENT OFFICE 2,503,538

DIAL TRANSMITTER WITH REMOVABLE NUMBER PLATE AND MEANS FOR ADJUSTING THE MAIN SPRING

Richard P. Arthur, Des Plaines, Ill., assignor to Kellogg Switchboard and Supply Company, Chicago, Ill., a corporation of Illinois Application April 1, 1947, Serial No. 738,646

6 Claims. (Cl. 179—90)

1

This invention relates to dial calling devices of the type generally used in automatic telephone systems. Its general object is to provide an improved calling device which is of sturdy construction, is reliable in operation, and may be economically produced.

A specific object is to provide a simple and reliable arrangement for detachably securing a card holder to the front of the dial.

A further object is to provide a simple and reliable arrangement for tightening or loosening the main spring.

A further object is to provide the governor shaft with a worm gear arrangement which may be economically produced.

Another object is to provide the improved calling device with a positive stop arrangement for stopping the main gear assembly at its normal position and at its extreme off-normal position.

According to one feature of the invention, the improved dial calling device is provided with a card holder having integral portions engaging the under side of a bezel spring which is secured to the main shaft, the card holder being sturdy to permit it to be turned an appropriate amount, to be removed or secured to the front of the dial.

According to another feature, a so-called spring retainer secured to the rear bearing of the main shaft may be turned to increase or decrease the tension in the main spring, and may be locked by a straddle member engaging marginal notches provided in the spring retainer.

According to another feature, the governor shaft is provided with a rolled spiral indentation in the nature of a thread or groove having the desired pitch, and a preformed spiral of wire is threaded onto the groove in the shaft to provide the desired worm gear.

According to another feature of the invention, the improved dial calling device is provided with a main-gear assembly having extended stop-arm engaging portions, extending from the cup-like housing, to control the extent of the movement of the main gear, and a raised portion acting as a cam to control the off-normal springs.

Other objects and features of the invention will appear as the description progresses.

The accompanying drawings, comprising Figs. 1 to 11, show views of the improved dial calling device embodying the invention.

Figs. 1 and 2 are respectively a front view and a rear view of the calling device.

Fig. 3 is a sectional view taken along line 3—3 of Fig. 1 with certain parts broken away.

2

Fig. 4 is a further rear view with certain parts broken away.

Fig. 5 is an enlarged sectional view taken along line 5—5 of Fig. 1, showing how the card holder is secured.

Fig. 6 is a view, partly in section, taken along line 6—6 of Fig. 4.

Fig. 7 is a view, partly in section, taken along line 7—7 of Fig. 2.

Fig. 8 is a view of the device, as seen from the left, in Fig. 2, with certain parts broken away.

Fig. 9 is an enlarged view of the governor shaft with its spiral spring partly assembled.

Fig. 10 is a side view of the improved calling device installed in a telephone desk stand, fragmentarily shown in section.

Fig. 11 is an exploded rear view showing in perspective the separate parts (5 to 7) comprising the card-holder assembly, together with bezel spring 12 for detachably securing it to the dial.

As shown in Fig. 1, the control portion of the improved calling device is the dial 1, which is provided with finger holes 2 beneath which lies a numeral ring 3 illustrated as having numerals 1 to 9, and 0 thereon. The dial may be rotated clockwise by placing a finger in the desired finger hole 2 and moving the dial around until the finger engages finger stop 4. When released, dial 1 proceeds contraclockwise under power stored in spring 31 to its illustrated normal position, generating on its return movement a number of impulses depending upon which finger hole was used.

As seen best in Figs. 1, 3, and 6 to 8, the dial 1 is mounted on the front or hub portion 21 of the main shaft 17, and held there by screw 14. Screw 14, which is countersunk into clamping washer 13, also retains bezel spring 12 which retains card holder 5, along with transparent card protector 6 and instruction card 7.

As seen in Figs. 1, 3, 5, 10, and 11, the card holder 5 is of a generally circular shape having its peripheral portions turned down. This downward extending portion is provided with two locating tabs 10 and an additional tab 8 to position the instruction card 7 when received within peripheral notch 7a. The top ring portion is provided with two inter-marginal notches 9 which cooperate in turning the holder incidental to securing it to the front of dial 1. With transparent card protector 6 and instruction card 7 in place within the card holder (see Figs. 1 and 3), the card holder is placed in position within the central recess in dial 1 and turned until its locating tabs 10 pass under the concerned outwardly inclined portions 16 and snap into position under portions 15 of bezel spring 12. Bezel spring 12 has its outer edges flared upwardly at portion 16 to provide inclined underlying cam surfaces which cooperate in turning holder 5 to its illustrated normal position. The removal of the card holder is readily accomplished by turning it until tabs 10 clear the flared edges 16 of spring 12.

As shown best in Figs. 3, and 6 to 8, the front or hub portion 21 of main shaft 17 is mounted in a bearing 45 provided centrally of cup-like housing 22. A shoulder 20 on shaft 17 restricts its forward movement. Attached to the rear of housing 22 are four mounting lugs 23 which may be secured to the housing as by riveting or staking.

As shown best in Fig. 7, a rear centrally located main bearing 53 is mounted in bearing bracket 34 which is secured to the rear of cup-like housing 22 by screws 37 and 38. Screw 37 also secures numeral ring 3 and finger stop 4 to the front of housing 22.

The main gear assembly, consisting of a main drive gear 25 (Figs. 4, 6 to 8) and cam disc 27, has a central opening to receive the main shaft 17 which has a flat portion 19 thereon, as seen in Fig. 4. This enables the main gear 25 and cam disc 27 which have similarly shaped openings therein, to be keyed to the main shaft and permanently secured thereto as by staking or riveting over. The main shaft 17 has a reduced end portion 18 which is received by the central opening in main bearing 53. The shoulder 93 on shaft 17 abuts the spring retainer 54 which is secured to bearing 53, as seen in Fig. 7.

The forward end of hub portion 21 has a flat portion 94 thereon, as seen in Fig. 1, thus enabling dial 1 and bezel spring 12 to be locked or keyed to the main shaft by being provided with a central opening of corresponding non-circular shape.

The main drive gear 25 is provided with a recess or counterbore 95 within which cam disc 27 lies. A peripheral portion 26 of the gear 25 is cut away to permit a radial stop arm 30 formed integrally with the cam disc 27 to extend therethrough, as shown best in Figs. 4 and 6. Cam disc 27 is also provided with a shear-formed tab 29 for holding the base end 32 of main spring 31 against rotation about the main shaft 17, and a peripheral side deformation 28 near the base of the stop arm 30 which acts as a cam to control the off-normal springs 42. As shown in Figs. 3 and 4, cup-like housing 22 is provided with two integrally formed stop portions 24 which extend inwardly from the wall portion thereof to control the extent of the rotational movement of the main drive gear 25. The engagement of radial stop arm 30, with one or the other of stops 24, acts to limit rotation of gear 25 in either direction. In Fig. 4, the main gear assembly is shown in its normal position and movement of dial 1 in a clockwise direction (as seen in Fig. 1) to its extreme position, causes main gear 25 together with its attached parts to be rotated contraclockwise (as seen in Fig. 4) until stop arm 30 engages stop portion 24. Upon the release of dial 1, it is restored to its illustrated normal position by power stored in spring 31.

Fixed with the main bearing 53 is a washer-like member 54 which has two shear-formed peripheral portions 55, one of which is used for holding the upper end 33 of main spring 31 against rotation about the main shaft. The peripheral notches 58 in member 54 are adapted to receive side members 57 of a U-shaped straddle member 56 to lock the main bearing 53 and member 54, which retains the upper end 33 of main spring 31 to bracket member 34. Suitable openings are provided in bracket 34 and straddle member 56 to receive bearing 53, and after being assembled, the top portion of bearing 53 may be staked or riveted over (Fig. 7) to prevent withdrawal. The openings in bracket 34 and member 56 are such as to allow bearing 53 to be turned to tighten or loosen the main spring. The top portion of bearing 53 is provided with a slot, so an ordinary screw driver may be used to turn it. To tighten main spring 31, bearing 53 is turned clockwise, as seen in Fig. 2, and locked by straddle member 56 when the desired spring tension is attained. To loosen the main spring, bearing 53 is turned clockwise until side members 57 unlatch member 54, then raising straddle member 56 and allowing the bearing assembly to turn contraclockwise until the desired spring tension is attained, whereupon member 56 will be returned to its locking position.

The main drive gear 25, when rotated, turns the impulse pinion gear 63, attached to pulse-cam shaft 60 (Figs. 4 and 7). Shaft 60 carries the worm-drive gear bearing 65, non-metallic worm-drive gear 66 (which is secured to bearing 65 as by riveting), ratchet 67, pulse cam 69, and breaker bearing 70, of which pinion gear 63 and ratchet 67 are secured to shaft 60. The pulse-cam shaft 60 is pivoted at one end in bracket 34 and at the other end in housing 22. As seen in Fig. 7, pinion gear 63 is provided with a cylindrical portion 96, and worm-drive gear bearing 65 is provided with a similar cylindrical portion 97. Cylindrical portions 96 and 97 are surrounded by a clutch spring 64 which permits the worm-drive gear bearing 65 and its attached non-metallic worm-drive gear 66 to remain stationary on the forward movement of the dial 1, but rotate on the restoration of the dial. Attached to pulse cam 69 is a breaker bearing 70 and two ratchet pawls 68 and 68'. The top ratchet pawl 68 restrains the pulse cam 69 from rotating on the forward movement of the dial 1, by engaging openings 35 (Fig. 2) of bracket 34 while the lower pawl 68' engages ratchet 67 (which is secured to the shaft) upon the start of the dial 1 to normal. Pawls 68 and 68' may be made of relatively thin spring material. The pulse cam 69 normally stands in a position, as illustrated in Figs. 2 and 7, with respect to impulse contact springs 41 controlled thereby. The free end of the pair of contact springs 41 (seen in edge view in Fig. 8) is normally opposite one of three cutaway portions of cam 69. The impulse contacts can thus be momentarily separated by one or another of the three lobes of the cam 69 by one-third rotation of the pulse-cam shaft.

The off-normal springs 42, seen in edge view in Fig. 8, are mounted in the same stackup with impulse springs 41. The impulse springs and off-normal springs may be connected in multiple with each other by suitable wiring between side terminals 49 (Fig. 2). The purpose of the off-normal springs 42 is to enable the last impulse of a train generated at impulse springs 41 to be rendered ineffective by shunting the springs 41 under control of cam 28. Another purpose of the off-normal springs is to short circuit the talking apparatus and its associated telephone set (not shown) during the time impulses are being sent to eliminate undue noise in the receiver. Off-normal springs 42 are held in their illustrated normal position (Fig. 8) by pressure of cam portion 28 (Figs. 4, 6 and 8) on insulating stud 43 (Fig. 8) affixed to an off-normal spring and an additional inter-spring stud 44.

As best shown in Figs. 2 and 8, an integral portion 36 of bracket 34 is extended outwardly to the right, as viewed in Fig. 2, and is tapped to receive mounting screws 51 of stackup 40 which are countersunk into clamping plate 50 (see Fig. 8). Stackup 40 is provided with screw terminals 48 for external connections from the improved dial calling device.

As best shown in Figs. 6 and 7 (see also Figs. 1 to 4), the main spring 31 furnishes the motive power for returning the dial and related mechanism to normal position and to generate the desired train of impulses during the return movement. The main spring 31 surrounds the portion of shaft 17 between cam disc 27 and spring retainer 54. Cam disc 27 is provided with a shear-formed tab 29 which holds the lower end 32 of main spring 31 against rotation about the main shaft 17. The upper end 33 of spring 31 being held by a shear-formed portion 55 of washer-like member 54, as previously stated.

The speed of the return movement is limited by a governor of the type consisting of weighted portions 80 rigidly secured to the ends of the arms of a U-shaped spring member 78 which is secured to a suitable hub 79 fixed to shaft 73. The shaft 73 is pivoted at one end in a cup-like screw 85, which is threaded into an extending portion 46 extending laterally from bracket 34 and is secured by lock-nut 86. The other end of shaft 73 is pivoted in a cup-like housing 81 which is secured to a portion 47 extending from bracket 34 by a spacer washer 82 and nut 83. When the shaft 73 rotates at a certain speed, the two weighted portions 80 (only one of which is shown) are moved outwardly by centrifugal force against the resistance of spring arms 78 and rub on the inside of cup-like housing 81, thereby limiting the speed of the device.

As shown in Fig. 9, the governor shaft is provided with a spiral groove 74 of the desired pitch, which may be rolled therein or cut as by a milling operation. A preformed spiral of wire 76, of a size and shape to snugly fit said groove, is threaded onto the groove in the shaft to provide the desired worm gear. Fig. 9 shows the preformed wire 76 partly threaded onto the groove 74 which extends to the right to provide a lead thread. The inside diameter of the preformed wire spiral 76 is preferably slightly less than the minor or root diameter of the groove, so that the preformed wire will be firmly held in place by friction, once it is threaded in place.

This method of providing the desired worm gear avoids the comparatively expensive milling or cutting operation in removing the excessive material in the manufacture of the desired worm gear.

Referring to Fig. 10, the improved dial calling device may be mounted in a telephone desk stand 90, which is provided with the usual opening therein for receiving the rear portion of the calling device. This opening has a turned in ledge portion 92, as indicated, which engages mounting lugs 23 to stop the inward movement of the calling device. The turned in ledge portion 92 is provided with apertures to receive mounting screws 91 which are threaded into mounting lugs 23 to secure the calling device.

*Operation*

The operation of the improved calling device in transmitting a train of impulses will now be described. Assume that a train of impulses corresponding to the digit 6, consisting of six momentary interruptions, is to be transmitted. The operator may place a finger in the finger hole 2 of the dial 1 above the digit 6 on the numeral ring 3, followed by the rotation of the dial in a clockwise direction (Fig. 1) until the finger strikes the finger stop 4. The finger is then removed from the dial 1, allowing the dial to return to its illustrated normal position under power stored in main spring 31.

As the dial 1 is brought forward, in a clockwise direction, the main shaft 17 is thereby turned against the tension of the main spring 31. The turning of the main shaft turns the main drive gear 25, which turns pinion gear 63 (in a contraclockwise direction) as it is rigidly secured to pulse-cam shaft 60. The engagement of upper ratchet pawl 68 in one of the openings 35, in bracket 34, prevents pulse cam 69 from turning as the dial 1 is brought forward in a clockwise direction.

During the forward movement of the dial, drive gear 25 also carries ratchet 67 (rigidly secured to pulse-cam shaft 60) in a contraclockwise direction through an angular distance corresponding to two and one-third revolutions which permits the lower ratchet pawl 68' to slide over 7 marginal notches in ratchet 67. Ratchet 67 being provided with three equally spaced marginal notches, bracket 34 is also provided with three similarly spaced openings 35, one of which is engaged by upper ratchet pawl 68 on the forward movement of the dial, as previously brought out.

The cam disc 27 being secured to the main shaft, rotates with the dial moving its integrally formed cam 28 out of reach of stud 43, thereby releasing pressure on the off-normal springs 42 permitting them to operate. The operation of the off-normal springs thereby takes the shunt off the impulse springs and short circuits the desired talking apparatus. Impulse springs 41 and the upper pair of off-normal springs (Fig. 8) being intended to be connected in multiple, as previously stated.

When the dial is released (after lower pawl 68' (Fig. 7) has passed over seven marginal notches in ratchet 67), the lower pawl 68' engages a marginal notch of ratchet 67 and spring clutch 64 engages worm-drive gear bearing 65 which is attached to worm-drive gear 66. Therefore, during the return movement of dial 1 and the main shaft 17 under the propulsion of main spring 31, the drive gear 25 and attached cam disc 27 are rotated in a contraclockwise direction, driving pulse-cam shaft 60 in a clockwise direction corresponding to the seven marginal notches of ratchet 67 and openings 35 of bracket 34. The velocity of the return movement is controlled by the governor (Figs. 2 and 10) whose worm gear is rotated by worm-drive gear 66 on pulse-cam shaft 60. The pulse-cam shaft is driven by the attached pinion gear 63, through the motion of the main drive gear 25.

The main drive gear is rotated an angular distance equal to two and one-third revolutions. Thus, two and one-third revolutions of the pulse-cam shaft 60 will occur. A lobe of the pulse-cam shaft 69 passes between the impulse springs 41, during each one-third revolution of the pulse-cam shaft. The impulse springs 41 are thus momentarily separated seven times on the return movement. Ordinarily, speed of the return movement is so regulated that the impulses are generated at the rate of about ten per second, although it may vary from nine to eleven with safety.

The first six separations of impulse springs 41 are effective, but the seventh and final separation of springs 41 is rendered ineffective by the upper set of off-normal contacts (Fig. 7) which are reclosed following the sixth or next to last separation, when cam portion 28 contacts insulating stud 43 (Figs. 4 and 8) to bring the upper pair of off-normal contacts into contact, and opening the lower pair of off-normal contacts thereby removing the shunt across the talking apparatus.

During the return movement, the upper pawl 68 passes over notches 35 in bracket 34. Mechanical noise is minimized by using a non-metallic worm-drive gear 65 to drive the worm gear on the governor shaft and by using a non-metallic washer 82 between governor housing 81 and portion 47 of bracket 34.

As previously brought out, the engagement of arm 30 of cam disc 27 with stop 24 of housing 22 stops the dial in its illustrated normal position. The motion of all parts of the improved dial calling device is thereby arrested.

I claim:

1. In a dial sender, a housing plate having a recess in one side thereof, an operating shaft extending laterally through the recessed portion of said plate and centrally thereof, a dial fixed with said shaft at one side of said plate, a gear fixed with said shaft within the recess of said housing plate, an arm fixed with said gear and extending radially from said shaft and passing radially through the gear, and a pair of projections extending inwardly from said housing into the path of said arm to limit the rotary movement of said shaft and dial, one in one direction and the other in the opposite direction.

2. In a dial sender, a housing plate having a recess in one side thereof, an operating shaft extending laterally through the recessed portion of said plate and centrally thereof, a dial fixed with said shaft at one side of said plate, a main gear fixed with said shaft within said recess, a stop arm fixed with said shaft within the recess of said housing plate, and extending radially from said shaft, a pinion gear operatively associated with the main gear in the path of the stop arm, and a pair of projections extending inwardly from said housing into the path of said arm to limit the rotary movement of said shaft and dial, one in one direction and the other in the opposite direction.

3. In a dial calling device, a housing plate, a bearing bracket fixed thereto, an operating shaft, one end of said shaft being rotatably mounted in said housing plate and the other end extending through said bracket, an actuating spring retaining member mounted about said shaft adjacent to said bracket, said spring retaining member having a hub portion extending rotatably through said bracket, said hub portion having a central bore rotatably receiving the end of said shaft which extends through said bracket, an operating spring surrounding said shaft, means for joining one end of said spring to said retaining member and means connecting the other end of said spring with said shaft, and a U-shaped holding member straddling said bracket, the inwardly directed legs thereof being capable of adjustment into a position to engage said retaining member to prevent reverse rotation thereof.

4. In a dial calling device, a housing plate, a bearing bracket fixed thereto, an operating shaft, one end of said shaft being rotatably mounted in said housing plate and the other end extending through said bracket, an actuating spring retaining member mounted about said shaft adjacent to said bracket, said spring retaining member having a hub portion extending rotatably through said bracket, said hub portion having a central bore rotatably receiving the end of said shaft which extends through said bracket, an operating spring surrounding said shaft, means for joining one end of said spring to said retaining member and means connecting the other end of said spring with said shaft, means on said hub to assist in the rotation thereof to increase the tension of said spring, and a U-shaped holding member straddling said bracket, the inwardly directed legs thereof being capable of adjustment into a position to engage said retaining member to prevent reverse rotation thereof.

5. In a dial calling device, a housing plate, a bearing bracket fixed thereto, an operating shaft, one end of said shaft being rotatably mounted in said housing plate and the other end extending through said bracket, an actuating spring retaining member mounted about said shaft adjacent to said bracket, said spring retaining member having a hub portion extending rotatably through said bracket, said hub portion having a central bore rotatably receiving the end of said shaft which extends through said bracket, an operating spring surrounding said shaft, means for joining one end of said spring to said retaining member and means connecting the other end of said spring with said shaft, means on said hub to assist in the rotation thereof to vary the tension of said spring, and a U-shaped holding member straddling said bracket, the inwardly directed legs thereof being capable of adjustment into a position to engage said retaining member to retain it in adjusted position.

6. In combination, a dial sender including a rotatable dial having a central recess in the exposed face thereof, a card holder retaining spring having diametrically opposed locking ends and extending transversely of said recess and means for fixing said spring at a central portion thereof with said dial within the recess thereof, each locking end of said retaining spring being formed at its lateral edges with outwardly extending cam surfaces and centrally with an outwardly arched retaining tab receiving recess, and a card holder having an inwardly extending flange arranged within said recess and engaging the side wall thereof for guiding said holder to the opposed locking ends of said retaining spring and for preventing edgewise movement therefrom, said flange being provided at the edge thereof with inwardly extending retaining tabs each adapted, upon rotary movement of said holder to pass under a cam surface and come to rest in a tab receiving recess.

RICHARD P. ARTHUR.

REFERENCES CITED

The following references are of record in the file of this patent:

UNITED STATES PATENTS

| Number | Name | Date |
|---|---|---|
| 1,556,906 | Blessing | Oct. 13, 1925 |
| 1,642,822 | Obergfell | Sept. 20, 1927 |
| 1,676,392 | Ide | July 10, 1928 |
| 1,949,447 | Beck | Mar. 6, 1934 |
| 2,204,181 | Gleason | June 11, 1940 |
| 2,346,906 | Cheney | Apr. 18, 1944 |